United States Patent
Cromer et al.

(10) Patent No.: US 6,684,326 B1
(45) Date of Patent: Jan. 27, 2004

(54) METHOD AND SYSTEM FOR AUTHENTICATED BOOT OPERATIONS IN A COMPUTER SYSTEM OF A NETWORKED COMPUTING ENVIRONMENT

(75) Inventors: Daryl C. Cromer, Apex, NC (US); Richard A. Dayan, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,725

(22) Filed: Mar. 31, 1999

(51) Int. Cl.[7] .................. G06F 15/177; G06F 11/30; H04L 9/00
(52) U.S. Cl. .................. 713/2; 713/1; 713/150; 713/156
(58) Field of Search .................. 713/1, 2, 201, 713/150, 156; 380/23, 25

(56) References Cited

U.S. PATENT DOCUMENTS

| | | | | |
|---|---|---|---|---|
| 5,210,795 A | * | 5/1993 | Lipner et al. .................. 380/23 |
| 5,257,378 A | * | 10/1993 | Sideserf et al. .................. 713/2 |
| 5,287,519 A | * | 2/1994 | Dayan et al. .................. 713/202 |
| 5,349,643 A | * | 9/1994 | Cox et al. .................. 380/25 |
| 5,390,324 A | * | 2/1995 | Burckhartt et al. .................. 714/23 |
| 5,421,006 A | * | 5/1995 | Jablon et al. .................. 714/36 |
| 5,680,547 A | * | 10/1997 | Chang .................. 709/222 |
| 5,870,554 A | * | 2/1999 | Grossman et al. .................. 395/652 |
| 5,919,257 A | * | 7/1999 | Trostle .................. 713/200 |
| 5,960,175 A | * | 9/1999 | Grossman et al. .................. 709/222 |
| 5,978,912 A | * | 11/1999 | Rakavy et al. .................. 713/2 |
| 6,006,333 A | * | 12/1999 | Nielsen .................. 713/202 |
| 6,009,524 A | * | 12/1999 | Olarig et al. .................. 713/200 |
| 6,161,178 A | * | 12/2000 | Cromer et al. .................. 713/2 |
| 6,185,678 B1 | * | 2/2001 | Arbaugh et al. .................. 713/2 |
| 6,189,100 B1 | * | 2/2001 | Barr et al. .................. 713/182 |
| 6,314,455 B1 | * | 11/2001 | Cromer et al. .................. 709/217 |
| 6,314,520 B1 | * | 11/2001 | Schell et al. .................. 713/200 |
| 6,446,203 B1 | * | 9/2002 | Aguilar et al. .................. 713/2 |
| 6,535,976 B1 | * | 3/2003 | Hoggarth et al. .................. 713/2 |

* cited by examiner

Primary Examiner—Thomas Lee
Assistant Examiner—Chun Cao
(74) Attorney, Agent, or Firm—Carlos Munoz-Bustamante; Sawyer Law Group, LLP

(57) ABSTRACT

Method and system aspects for performing an authenticated boot of a computer system in a networked computing environment are provided. The aspects include integration of boot manager services into a power on self test (POST) routine of a client system. The client system provides a digital signature for a selected operating system when the POST routine transfers control to a basic input/output system (BIOS) routine. Booting is authorized with the operating system through authentication by a server system of the digital signature.

16 Claims, 4 Drawing Sheets

METHOD AND SYSTEM FOR AUTHENTICATED BOOT OPERATIONS IN A COMPUTER SYSTEM OF A NETWORKED COMPUTING ENVIRONMENT

FIELD OF THE INVENTION

The present invention relates to boot services in a computer system, and more particularly to authenticating boot operations in a computer system of a networked computer environment.

BACKGROUND OF THE INVENTION

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

Today's PCs may contain several operating systems on their storage system. The user is typically presented with a choice of the several operating systems with which to boot following a power up or after a soft boot (i.e., alt-ctrl-del key selection), through an appropriate program, such as boot manager. However, there is no way that boot manager can control which operating system a user boots. Further, there is no authorization or authentication involved in the process, which could result in the booting of an incorrect image of an operating system, particularly in a networked computing environment.

Accordingly, a need exists for authentication/authorization during a boot procedure on a computer system, particularly in a computer network environment. The present invention addresses such a need.

SUMMARY OF THE INVENTION

Method and system aspects for performing an authenticated boot of a computer system in a networked computing environment are provided. The aspects include integration of boot manager services into a power on self test (POST) routine of a client system. The client system provides a digital signature for a selected operating system when the POST routine transfers control to a basic input/output system (BIOS) routine. Booting is authorized with the operating system through authentication by a server system of the digital signature.

Through the present invention better control over booting in a computer system is achieved with the incorporation of encryption techniques into the boot process. These and other advantages of the aspects of the present invention will be more fully understood in conjunction with the following detailed description and accompanying figures.

DETAILED DESCRIPTION

The present invention relates to authenticated and authorized boot operations in a computer system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
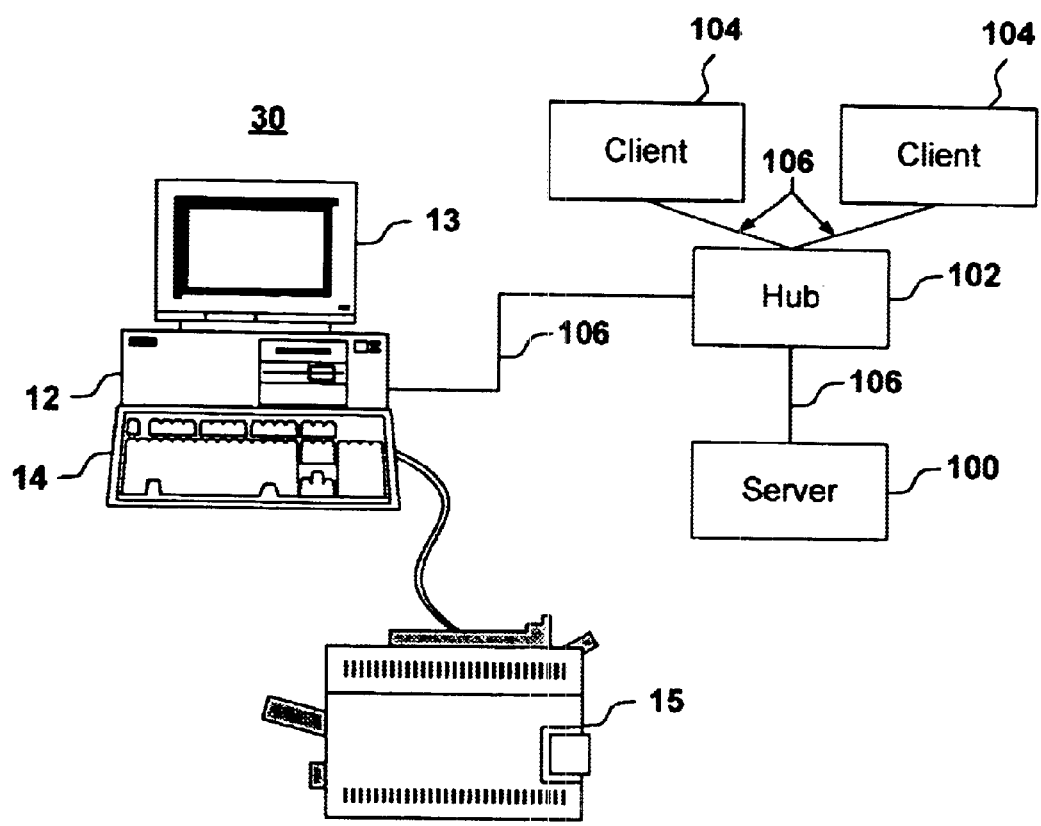
FIG. 1 is an illustration of a data processing system in accordance with the present invention.

FIG. 1 illustrates a pictorial representation of a data processing system including a plurality of client computer systems 104 coupled to a server computer system 100 utilizing a hub 102 in accordance with the method and system of the present invention. Each client computer system 104 and server computer system 100 may be implemented utilizing a computer system 30. Server computer system 100 and client computer systems 104 are connected to hub 102 utilizing a communication link 106. Communications link 106 may conform to a local area network standard such as the Ethernet specification. Those skilled in the art will recognize that the invention described herein may be implemented utilizing any suitable type of data communications channel or link. In addition, communications link 106 may simultaneously include multiple different types of data communications channels.

Computer system 30 includes a computer 12, a monitor 13, a keyboard 14, and a printer or plotter 15. Computer system 30 may be implemented utilizing any commercially available computer system which has been suitably programmed and which has been modified as described below.

Figure 2:
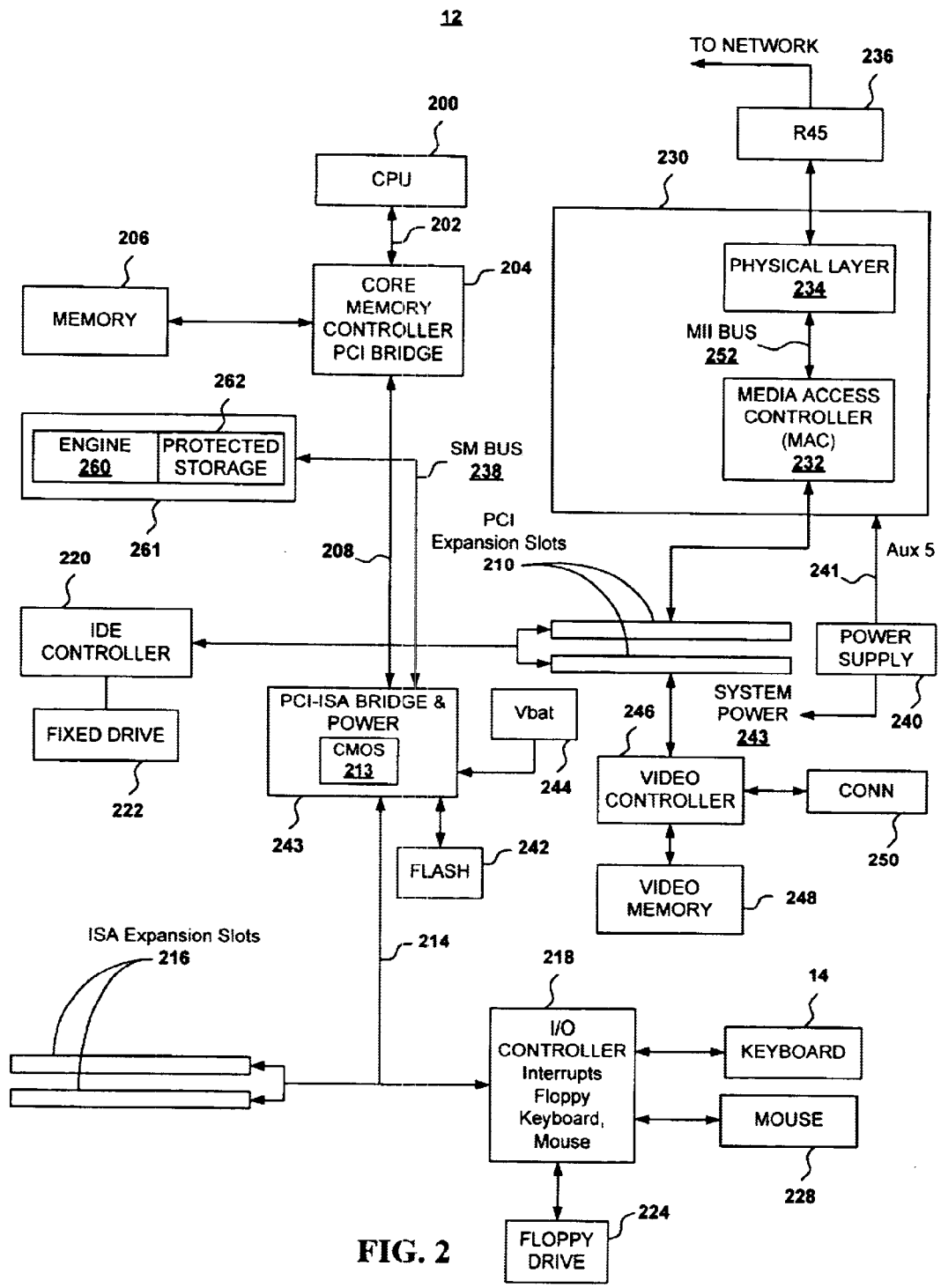
FIG. 2 is a more detailed representation of a computer system of the data processing system of FIG. 1.

FIG. 2 depicts a more detailed pictorial representation of the data processing system of FIG. 1 in accordance with the method and system of the present invention. Computer 12 includes a planar (also commonly called a motherboard or system board) which is mounted within computer 12 and provides a means for mounting and electrically interconnecting various components of computer 12 including a central processing unit (CPU) 200, system memory 206, and accessory cards or boards as is well known in the art.

CPU 200 is connected by address, control, and data busses 202 to a memory controller and peripheral component interconnect (PCI) bus bridge 212 which is coupled to system memory 206. An integrated drive electronics (IDE) device controller 220, and a PCI bus to Industry Standard Architecture (ISA) bus bridge 204 are connected to PCI bus bridge 204 utilizing PCI bus 208. IDE controller 220 provides for the attachment of IDE compatible storage devices, such as a removable hard disk drive 222. PCI/ISA bridge 212 provides an interface between PCI bus 208 and an optional feature or expansion bus such as the ISA bus 214. PCI/ISA bridge 222 provides an interface between PCI bus 208 and an optional feature or expansion bus such as the ISA bus 214. PCI/ISA bridge 212 includes power management logic. PCI/ISA bridge 212 is supplied power from battery 244 to prevent loss of configuration data stored in CMOS 213.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 14, and mouse 228 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system.

Computer 12 includes a video controller 246 which may, for example, be plugged into one of PCI expansion slots 210. Video controller 246 is connected to video memory 248. The image in video memory 248 is read by controller 246 and displayed on monitor 13 which is connected to computer 12 through connector 250.

Computer system 12 includes a power supply 240 which supplies full normal system power 243, and has an auxiliary power main AUX 5 241 which supplies full time power to the power management logic 212, and to a network adapter 230.

Network adapter 230 includes a physical layer 234 and a media access controller (MAC) 232 coupled together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234. Network adapter 230 may be plugged into one of the PCI connector slots 210 (as illustrated) or one of the ISA connector slots 216 in order to permit computer system 30 to communicate with server 100 utilizing communications link 106.

MAC 232 processes digital network signals, and serves as an interface between a shared data path, i.e., the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path, and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mbps CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of computer system 30. Second, it advertises its own capabilities to server computer 100. Third, it establishes a connection with server computer 100 using the highest performance connection technology.

In accordance with the present invention, the planar includes an encryption device 261 which includes an encryption/decryption engine 260 which includes an encryption/decryption algorithm, which is utilized to encode and decode messages transmitted and received by the planar and protected storage 262. Engine 260 can preferably perform public/private key encryption. Encryption algorithms are known to ensure that only the intended recipient of a message can read and access the message. One known encryption algorithm is an asymmetric, or public key, algorithm. The public key algorithm is a method for encrypting messages sent from a first computer system to a second computer system. This algorithm provides for a key pair including a public key and a private key for each participant in a secure communication. This key pair is unique to each participant. An example of such an encryption scheme is an RSA key pair system.

Engine 260 may access a protected storage device 262. Protected storage device 262 is accessible only through engine 260 and is a one-time writable device. Therefore, storage device 262 cannot be read or written to by the planar, device 222, or any other device. Hardware master keys stored within storage 262 are protected by engine 260 and are not accessible to the planar or its components. A hardware master key pair is established for the system. The hardware master key pair includes a master private key and a master public key. The hardware master key pair is associated with the system so that the master private key is known to only the data processing system for which it was established. Storage device 262 is utilized to store the hardware master key pair, including the master private key and master public key. Device 262 may be implemented utilizing an electronically erasable storage device, such as an EEPROM. Access may be gained to non-readable storage device 262 in order to initially store the master private key. However, after the master private key is stored, it cannot be read. The keys stored in EEPROM 262 may not be read by any component of the planar other than engine 260.

Encryption device 261, including engine 260 and EEPROM 262, is coupled to PCI-ISA bridge 212 utilizing a system management (SM) bus 238. System management bus 238 is a two-wire, low speed, serial bus used to interconnect management and monitoring devices. Those skilled in the art will recognize that encryption device 261 may be coupled to another bus within the planar.

Figure 3:
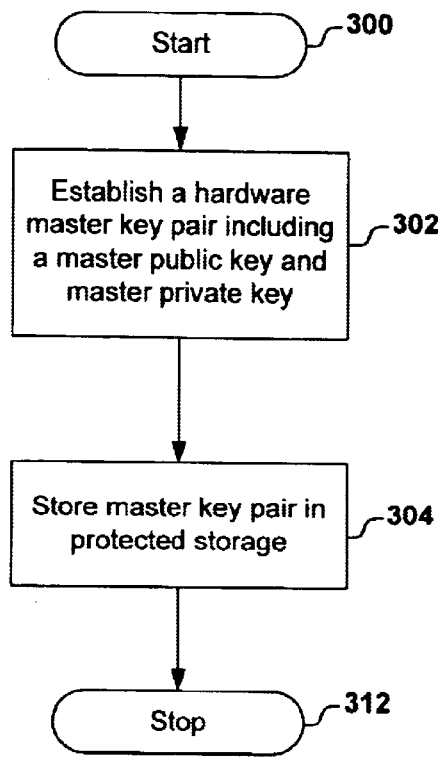
FIG. 3 is a high level block diagram for establishing and storing a secure data block in the data processing system of FIG. 1.

FIG. 3 illustrates a high level flow chart which depicts establishing and storing a secure data block utilizing a hardware master key pair in a data processing system in accordance with the method and system of the present invention. A block of data is established within the system and is associated with a particular user and a particular application. The block of data includes information regarding the associated user and application. For example, the data block may include a user's name, password, and credit card number. The process starts as depicted at block 300 and thereafter passes to block 302 which illustrates establishing a hardware master key pair for data processing system 30. Next, block 304 depicts the storage of the master public key and master private key in protected storage 262. Such data blocks are utilized in order to provide authentication/authorization during a boot procedure for a computer system attached to a network in the present invention, which integrates the boot manager services into POST (power on self test) and uses the digital signature function provided on the system board.

Figure 4:
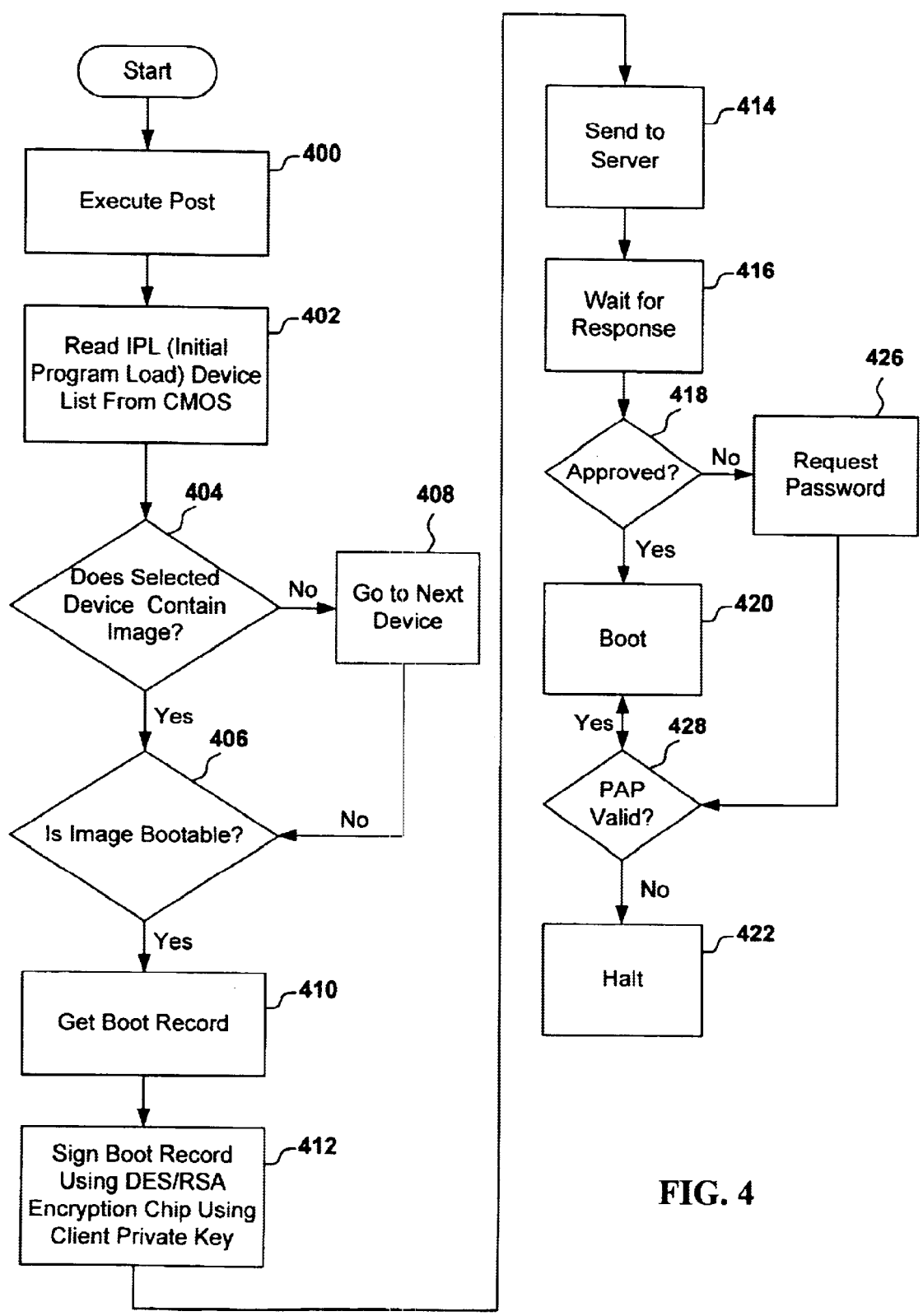
FIG. 4 is a block flow diagram of an authenticated booting process in a client system of the data processing system in accordance with the present invention.

Referring to FIG. 4, when a client system 104 is first powered up (or is soft-booted), POST gains control of the system (step 400). POST initializes the system to a known state prior to booting the operating environment. When it is time to boot the operating system, POST passes control to boot BIOS (e.g., Int 19h), and the boot BIOS reads the initial program load (IPL) boot device list from CMOS 213 (step 402). The boot BIOS suitably uses the well-known default order for PCs, i.e., diskette, hardfile, then network, to select the boot device. Alternatively, a pre specified list of bootable devices is presented to the user for selection. Boot BIOS then accesses all bootable partitions on the bootable device.

A determination of whether a first selected device contains an image of a desired operating system occurs (step 404). When the device does contain an image, a determination of whether the image is bootable is made (step 406). When either the device does not contain an image or the image is not bootable, a next device in the list is selected (step 408) and checked. Once a bootable image is found, the boot record for that image is read in from the device (step 410).

The boot record is then signed using the encryption chip 261 with the client's private key (step 412). BIOS hashes the boot record with a hash algorithm from engine 260, encrypts the hash digest and sends the signed record to the server 100 (step 414). The client system 104 then waits for a response (step 416). When the signed boot record is approved, as determined via step 418, the system boots (step 420). When the signed boot records is not approved a password is requested, via step 426. If the password is valid via step 428, then the system boots via step 420. If the password is invalid, then the system is halted, via step 422.

Figure 5:
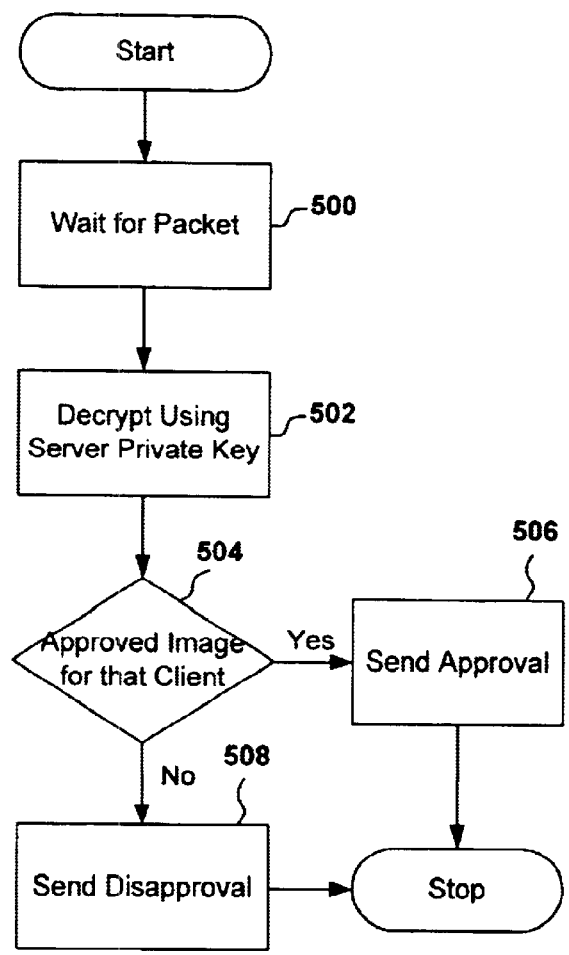
FIG. 5 is a block flow diagram of a server system's process for the authentication booting process of FIG. 4.

Referring now to FIG. 5, from the perspective of the server system 100, the approval process proceeds once a packet with the signed boot record is received (step 500). The server decrypts the packet using the server's private key (step 502). The server 100 then determines whether the image received is approved for the client identified by either the client's public key or certificate included in the packet by decrypting the signature using its engine 260 and comparing the decrypted received hash to a list of authorized operating system boot record hashes (step 504). The server 100 sends an indicator that the packet is approved (step 506) or disapproved (step 508) back to the client system 104 attempting to boot based on whether the received hash matches an authorized hash. The client system 104 then boots or halts appropriately, as described above.

Thus, through the present invention, a boot process for a computer system attached to a network is authenticated to ensure authorized access to an operating system image. Further, the present invention avoids booting an incorrect operating system image.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A method for performing an authenticated boot of a computer system in a networked computing environment, the method comprising:
   (a) integrating boot manager services into a power on self test (POST) routine;
   (b) providing a digital signature for a selected operating system when the POST routine transfers control to a basic input/output system (BIOS) routine, including reading an initial program load device list of available boot devices during the BIOS routine, determining whether a selected device of the available boot devices contains an image of an operating system, proceeding to a next device until the image is located, determining whether the image is bootable, proceeding to the next device until the image is bootable, and retrieving a boot record for the image, signing the boot record using a private key for the computer system, and sending the signed boot record to a server system; and
   (c) authorizing booting with the selected operating system through authentication by the server system of the digital signature.

2. The method of claim 1, further comprising booting the computer system upon receipt of an approved status for the signed boot record from the server system.

3. The method of claim further comprising halting booting of the computer system upon receipt of a disapproved status for the'signed boot record from the server system.

4. A data processing system with authenticated boot capabilities, the system comprising:
   at least one client system utilizing boot manager services during a power on self test (POST) routine to select an operating system and provide a digital signature for the operating system selected; and
   a server system coupled to the at least one client system for verifying the digital signature and approving the selected operating system to provide authentication for the boot operation in the at least one client system.

5. The system of claim 4, wherein the at least one client system provides a digital signature for a selected operating system when the POST routine transfers control to a basic input/output system (BIOS) routine.

6. The system of claim 5, wherein the BIOS routine reads an initial program load device list of available boot devices.

7. The system of claim 5, wherein the at least one client system further determines whether a selected device of the available boot devices contains an image of an operating system, and proceeds to a next device until the image is located.

8. The system of claim 7, wherein the at least one client system further determines whether the image is bootable, and proceeds to the next device until the image is bootable.

9. The system of claim 8, wherein the at least one client system provides a digital signature by retrieving a boot record for the image, signing the boot record using a private key for the computer system, and sending the signed boot record to the server system.

10. The system of claim 9, wherein the at least one client system boots upon receipt of an approved status for the signed boot record from the server system.

11. The system of claim 10, wherein the at least one client system halts booting upon receipt of a disapproved status for the signed boot record from the server system.

12. A method for performing an authenticated boot of a computer system in a networked computing environment, the method comprising:

utilizing digital signature encryption in a client system to encrypt a boot record;

sending the encrypted boot record to a server system; and determining authentication of the encrypted boot record in the server system to control booting operations in the client system.

13. The method of claim 12, wherein determining authentication of the encrypted boot record further comprises decrypting the encrypted boot record and comparing the decrypted boot record to a list of authorized operating system boot records.

14. The method of claim 13, wherein when the encrypted boot record matches an authorized boot record in the server system, the booting operations proceed in the client system.

15. The method of claim 14, wherein when the encrypted boot record does not match an authorized boot record in the server system, the booting operations are halted in the client system.

16. The method of claim 12, wherein the client system utilize s RSA encryption algorithms for the digital signature encryption.

* * * * *